United States Patent [19]
Brazdo

[11] 3,915,309
[45] Oct. 28, 1975

[54] FOOD RETENTION RACK
[76] Inventor: Florencia G. Brazdo, 1314 S. 58th Court, Cicero, Ill. 60650
[22] Filed: Nov. 27, 1974
[21] Appl. No.: 527,614

[52] U.S. Cl. ............... 211/13; 99/385; 99/448; 211/11; 211/41
[51] Int. Cl.² ............... A47J 37/08; B42F 17/00
[58] Field of Search ............ 99/385, 389, 391–394, 99/416, 418, 448; 211/10, 11, 13, 40, 41, 120

[56] References Cited
UNITED STATES PATENTS

| | | | |
|---|---|---|---|
| 600,879 | 3/1898 | Louden | 211/11 |
| 1,212,340 | 1/1917 | Fluharty | 99/389 |
| 2,205,064 | 6/1940 | Irwin | 211/40 |
| 2,249,265 | 7/1941 | Bauder | 211/11 |
| 2,429,025 | 10/1947 | Kerber et al. | 99/385 X |
| 2,592,203 | 4/1952 | Snyder | 211/13 |
| 2,769,550 | 11/1956 | Rollins et al. | 211/11 |

Primary Examiner—Roy D. Frazier
Assistant Examiner—Terrell P. Lewis
Attorney, Agent, or Firm—Dominik, Knechtel, Godula & Demeur

[57] ABSTRACT

A rack, especially designed for retaining hot toasted bread, the rack being a unitized modular rack formed by a plurality of channels, each rack including a plurality of leg means for maintaining the lower surface thereof above an underlying support surface, a handle mounted on and extending laterally outwardly from one end of the rack, each of the channels bounded by opposed sidewalls formed by spaced ribs and having open spaces therebetween, and each of the channels being open at the top end, the bottom portion of each of the channels having a V-shaped configuration and having one leg of the V-shaped bottom portion formed by a solid wall and the opposed leg of the V-shaped bottom portion being essentially an open space with at least support rib extending laterally thereacross such that toasted bread positioned within the channel will assume an angularized posture due to the V-shape bottom portion, the solid wall portion of the V slidably positioning the toasted bread into an angularized posture with the top end of the bread resting against the corresponding sidewall, the rack being substantially open such as to permit efficient air circulation and permit cooling while still maintaining the toast in crisp condition.

5 Claims, 2 Drawing Figures

U.S. Patent  Oct. 28, 1975  3,915,309
FIG. 1
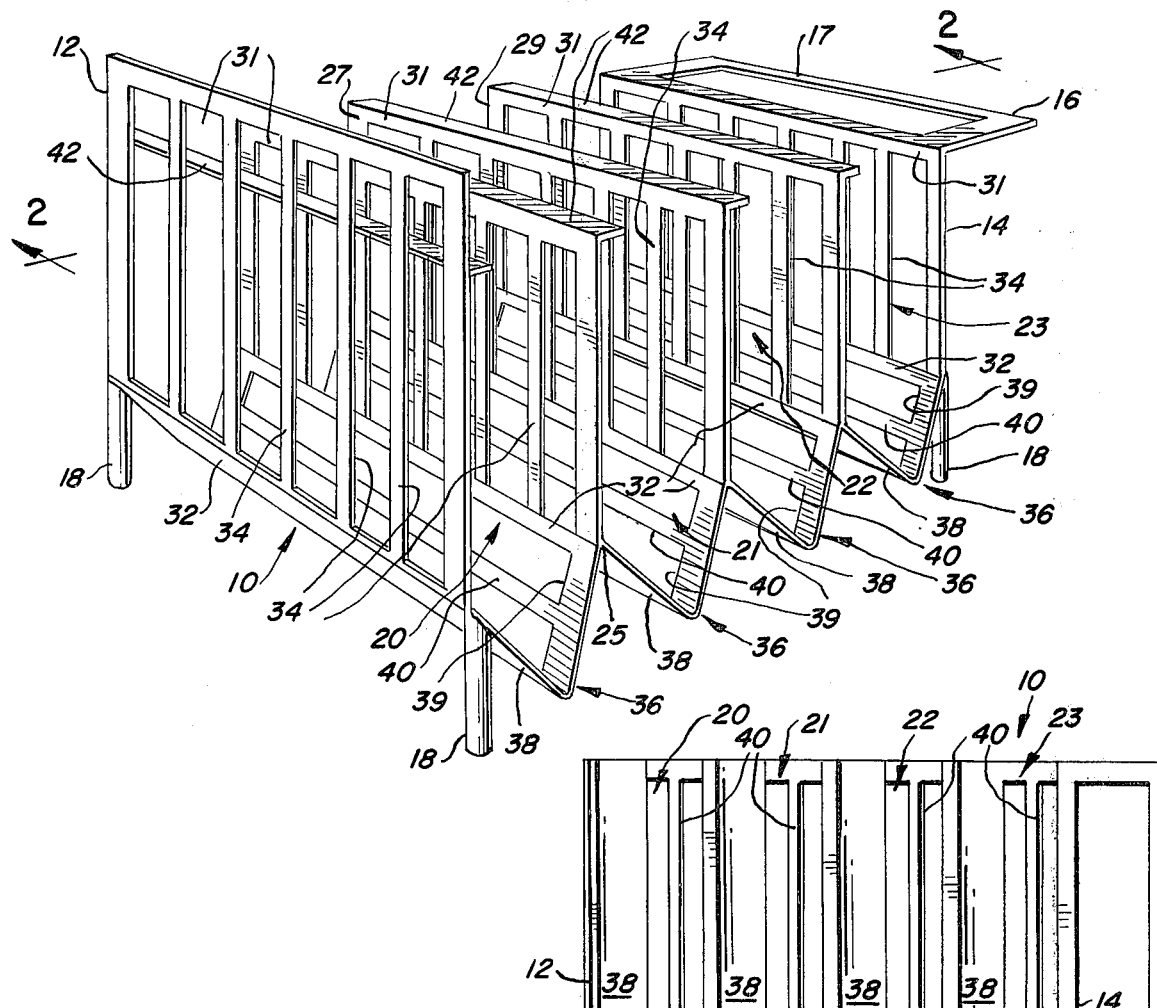
FIG. 2
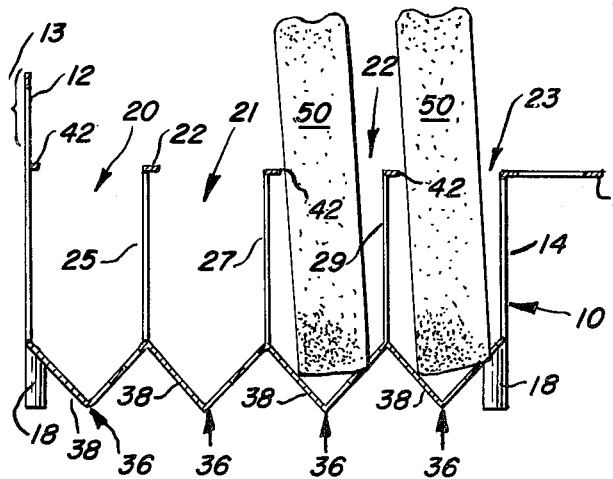
FIG. 3

FOOD RETENTION RACK

BACKGROUND OF THE INVENTION

The number and variety of food retention articles or food preparation devices has multiplied extensively in the last 20 years. The primary reason for such multiplicity of items is to simplify a food preparation operation, or alternatively, to provide a more efficient food handling apparatus which in turn, renders the food more palatable. In this connection, a variety of food handling items are known in the art, such as egg racks, milk containers, food dispending apparatus, and the like. It is also known that one of the motivating causes for the development of this device is the extensive use of plastics which permit the molding of such devices at an economical cost bringing such devices within the reach of the mass market. Generally, it can be said that the end goal to be obtained is to simplify food handling operation in an economical manner by providing an item which will not only facilitate the food handling operation, but also result in a more appetizing food article once prepared.

The present invention concerns itself with the development of a rack especially designed for retaining toasted bread once the same has been retrieved the toasting device such as a toaster, oven, or the like. Generally, it is well known that in most food service establishments, toasted bread is served to the customer by stacking the same on a plate such that a stack of anywhere from two to four pieces of bread are laid atop one another. The stacking operation is generally effected by simply removing the toasted bread from the toasting device and merely laying the same on a plate, one toasted bread slice atop the other. Generally, during the cooling of the bread, moisture condenses on each of the slices, especiaally those postioned between the bottom and top slice. Where only two slices are stacked on a plate, it is common knowledge that any moisture will condense between the lower surface of the top slice and the top surface of the lower slice such that both of the toasted slices of bread lose their crispness yielding a moisture-laden slice of toasted bread. Obviously, toasted bread in this condition is not very appetizing, and in addition, difficulty is often encountered in terms of applying a spread onto the bread surface, such as butter, jelly, or the like. In short, the bread slice which is laden with moisture tends to be quite soft and therefore very tearable such that when attempting to apply a spread of butter or the like thereon, the slice will disintegrate to a great extent.

The same problems are encountered in terms of home use since the common procedure is, once again, to merely stack toasted bread when it is retrieved from a toaster or the like.

There have been attempts in the prior art to develop devices which can accommodate toasted slices of bread, however, it is apparent that such devices have not met with any commercial success for the reason that generally the same has not been efficient in terms of the result obtained with the resulting food article. In this connection, U.S. Pat. No. 92,663 is directed to a toast rack formed by a plurality of circular elements mounted on a lower support. The individual toast slices are positioned in the channels formed by adjacent circular elements thereby to separate the toast slices from one another and permit the individual cooling thereof in spaced relationship with respect to any underlying support surface and with respect to one another. However, it is believed that efficient air circulation is still not achieved even though the channels are substantialy open to provide maximum air passage over and around the individual toast slice. In addition, the toast rack depicted in the aforementioned patent is not designed with a view toward economy in terms of manufacture and therefore lacks efficiency in the economic terms.

Another form of a rack for holding slices of toasted bread and the like is shown in U.S. Pat. No. 2,592,203 which shows a four channel rack formed by interposing the sidewalls, the sidewalls and end walls being positioned in an angular disposition such that the toast slices are in an angularized posture when positioned within the rack. While it is believed that this particular structure is more efficient than the toast rack structure depicted in U.S. Pat. No. 92,663, nevertheless, there are still additional drawbacks incident to the structure shown in U.S. Pat. No. 2,592,203 mainly resulting from the fact that the bottom portion and top side portions of the toast slices are positioned flatly against the lower surface and side surfaces of the subject rack. It is believed that such flat positioning interferes to some extent with efficient air circulation and hence, the individual toast slice is not uniformly cooled to a crisp and appetizing end product.

A variety of other racks suitable for kitchen use are shown in the art but none have obtained any degree of efficiency in terms of a rack especially designed for retaining hot food articles such as toasted slices of bread.

SUMMARY OF INVENTION

The present invention provides a rack especially designed to accommodate and retain the toasted slices of bread wherein the rack, in the preferred embodiment, includes four channels for retaining four individual slices of bread, the rack being formed as a unitized modular rack. Each of the channels is formed by an open top, opposed sidewalls which are substantially open and include a plurality of spaced ribs with open spaces therebetween, and bottom portion of the rack formed by a V-shaped bottom portion, one wall of the V providing a solid wall while the opposed leg of the V being substantially open and including only a support rib extending thereacross to provide food retaining support for the bread slice positioned therein. The V-shaped bottom portion will cause the bread slice to be positioned in an angularized posture when inserted therein with a minimum of contact as between the bread slice and any portion of the rack such as to maximize the efficiency of air circulation over and around the bread slice such that the resulting product is easily cooled and crisp in terms of consistency. In addition, the preferred embodiment of the subject toast rack of the present invention is provided with a support flange positioned on the top end of the sidewall immediately adjacent to the solid wall portion of the leg of the V-shaped bottom portion such that once the toast slice is positioned within the channel and positioned in the angularized posture, the top edge of the slice will come to rest against the support flange thereby to be out of contact with the side wall thereby providing even greater efficiency in terms of air circulation.

OBJECT AND ADVANTAGES

The principal object of the present invention is, therefore, to provide a rack especially designed for accommodating and retaining individual slices of toast therein wherein the rack maximizes the degree of air circulation to provide a cooled slice of toasted bread which is crisp in terms of consistency, and therefore highly appetizing.

A further object of the invention is to provide a rack designed for retaining toasted slices of bread, the rack being a unitized modular rack formed by a plurality of channels, the rack including a plurality of leg means for maintaining the lower portion thereof above and out of contact with an underlying support surface, a handle mounted on and extending laterally outwardly from one end of the rack, each of the channels bounded by opposed sidewalls formed by spaced ribs and having open spaces therebetween, and each of the channels being open at the top end, the bottom portion of each of the channels having a V-shaped configuration and having one leg of the V-shaped bottom portion formed by a solid wall and the opposed leg of the V-shaped bottom portion being essentially in open space with at least one support rib extending laterally thereacross to provide food articles' support such that the major portion of the channel retaining an individual slice of toasted bread therein is essentially open to provide efficient air circulation over and around the subject bread slice such that upon cooling, the slice of toasted bread is crisp and appetizing.

In connection with the foregoing object, it is a further object of this invention to provide a subject toast rack of the type described wherein each of the sidewalls further includes a support flange mounted on the sidewall immediately adjacent to the solid wall portion of the V-shaped bottom portion of the channel such that the support flange overhangs above the solid wall portion thereof such that when the bread slice is positioned within the channel, the solid wall portion of the V-shaped bottom portion will cause the bread slice to assume an angularized posture with the top portion thereof supported by the support flange in order to insure the maximum amount of air circulation in and about the retained and supported food slice.

Further features of the invention pertain to the particular arrangement of the elements and parts whereby the above-outlined and additional operating features thereof are attained.

The invention, both as to its organization and method of operation, together with further objects and advantages thereof, will best be understood by reference to the following specification, taken in connection with the accompanying drawings in which:

FIG. 1 is a perspective view of the preferred embodiment of the food rack of the present invention;

FIG. 2 is a side elevation with a view of the subject food rack showing bread slices in two of the four channels; and FIG. 3 is a top view of the subject food rack of the present invention showing the configuration of the V-shaped bottom portion and the disposition of the handle relative to the rack.

Referring now to the drawings, the subject toast rack is generally indicated by the numeral 10. The rack 10 is shown to be formed by a first end wall 12 and a second end wall 14, the second end wall 14 having a handle 16 positioned at the top end thereof and extending laterally outwardly therefrom. Each of the first and second end walls 12 and 14 respectively include two opposed legs 18 extending downwardly therefrom such that the rack 10 may be positioned upon an underlying support surface (not shown) thereby to position the rack 10 onto the underlying support surface.

It will be noted that the handle 16 includes a cutout section 17 which thereby facilitates the ability of the user to grasp the handle 16 by positioning one or more fingers through the cutout section 17 in order to lift and carry the rack 10.

It will further be noted that the rack 10 is provided with four bread slice channels 20, 21, 22, and 23, which are designed to accommodate a single slice of bread 50, as shown in FIG. 2 of the drawings. It will be observed that channel 20 is separated from channel 21 by means of a separation wall 25, and similarly, channel 21 and channel 22 are separated by a separation wall 27 while similarly, channels 22 and 23 are separated by a third separation wall 29. Each of the first end wall 12 and second end wall 14 as well as the separation walls 25, 27, and 29 are constructed in a similar manner. For sake of convenience and description, similar structures shall be referred to by similar numerals hereinbelow.

With regard to the construction of each of the walls 12, 14, 25, 27, and 29, it will observed that the said walls are bounded by a top rail 31 and a bottom rail 32, having a plurality of support ribs 34 extending vertically between the top rail 31 and the bottom rail 32. The support ribs 34 are spaced apart one from the other a sufficient distance such that relatively large open spaces are interposed between adjacent support ribs 34 whereby a substantial portion of the rack 10 is open to permit maximum air circulation. Similarly, it will be observed that the top end of each of the channels 20, 21, 22, and 23 are open thereby to permit the insertion and removal of bread slices from therebetween.

The bottom portion of each of the channels 20, 21 22 and 23 are shown to assume a V-shape configuration generally referred to by the numeral 36. The V-shape bottom portion 36 is formed by a solid wall 38 and an open slot 39, the open slot including a horizontal support bar 40 extending laterally thereacross. Hence, the support bar 40 provides lateral support for the bread slice once it is positioned within the respective channel.

It will further be observed that the first end wall 12, and the three separation walls 25, 27, and 29 respectively are each provided with a support flange 42 extending laterally outwardly from the corresponding top rails 31 of the separation walls 25, 27, and 29 respectively, and the support flange 42 positioned on the end wall 12 is mounted thereon in substantially horizontal alignment with respect to the support flanges 42 on the separation walls 25, 27, and 29. Each of the support flanges 42 is shown to be positioned such that the same extends laterally inwardly into the corresponding channel 20, 21, 22, and 23, and positioned above the solid wall 38 of the V-shaped bottom portion 36.

Functionally, the structure defined above consisting of the support flange 42 overhanging the solid wall 38 of the V-shaped bottom portion 36 of each channel 20, 21, 22, 23 causes the bread slice 50 positioned within the corresponding channel 20, 21, 22, 23 to assume an angularized posture is more particularly shown in FIG. 2 of the drawings. Operationally, once the bread slice 50 is positioned within the channel 20, 21, 22, 23 the edge of the bread slice contacting the solid wall 38 will have a tendency to slide downwardly therealong until the side portion of the bread slice 50 comes to rest against the support flange 42. The angularized posture of the bread slice assures that the maximum air curculation will occur in and around the entire bread slice when positioned in the rack 10 since even the bottom end of the bread slice 50 can be cooled, the apex portion of the V-shaped bottom portion 36 assuring that air will flow from underneath the bread slice as well as the open slotted separation walls 25, 27, and 29 assuring that air flows laterally thereby to permit the entire cooling of the bread slice within a very short time frame.

It will further be noted that first end wall 12 is slightly enlarged vertically such that there is extension portion 13 which extends upwardly beyond the support flange 42 thereof. It is contemplated that decorative paraphernalia may be mounted on said extension portion 13 to increase the aesthetic appeal of the subject rack 10.

In terms of manufacture, the rack 10 is designed to be manufactured as a unitary modular rack such that all of the elements defined above are integrally formed. Indeed, it is contemplated that the subject rack can easily be manufactured from any suitable plastic material such as polypropylene or any other relatively hard plastic. In such an event, it is contemplated that the subject rack may be made by way of a typical injection mold process where the mold is cut in the shape of the subject rack and this injection process utilized. Another advantage to be obtained by the use of a plastic such as polypropylene is the fact that this material will withstand sterilization temperatures in excess of 300° F and therefore, the device may be positioned within a dishwasher for cleaning purposes. By utilizing an injection molded process to manufacture the subject rack, the danger of bacteria entrapped within the joints which is inherent in forming a holder from metal is eliminated. In addition, the use of a plastic material permits the availability of a multitude of colors such that the device may be made aesthetically pleasing to accommodate the requirements of the mass market.

Representative of an ideal size for the subject rack would include a rack having four compartments wherein the overall dimension would be 3 inches wide, 5 inches deep, and 3 inches high. It is anticipated that the handle 16 need not exceed one inch in lateral extension such that the overall sizing of the device is such as to permit the same to be easily stored in any kitchen cabinet or other storage space.

The above-noted size dimensions for the preferred embodiment of the subject toast rack perform a functionally important role. It has been noted that commercially available sliced bread generally averages between 3½ inches to 4 inches in width. Hence, by constructing the rack with a 3 inch width, the side edges of the toasted bread slice will extend laterally outwardly beyond the edges of the rack. In this manner, cooling of the toasted slice when positioned in the rack is further facilitated.

It will be appreciated from the above description that pursuant to the present invention, there has been provided a rack especially suitable for holding toasted bread slices in order to permit the same to cool once removed from the toasting apparatus. The device is so constructed as to permit efficient air circulation above and around the subject bread slice such that an even and uniform cooling is achieved. Functionally, the uniform cooling of the bread slice eliminates the moisture problem generally incident to cool the toast and presents the user with a crisp and appetizing food morsel. In addition, the toasted bread slice once cooled, due to the crispness obtained, permits the easy spreading of any spread such as butter or the like thereon.

While there has been described what is at present considered to be the preferred embodiment of the invention, it will be understood that various modifications may be made therein and it is intended to cover any appended claims all such modifications as fall within the true spirit and scope of the invention.

What is claimed is:

1. A rack for holding hot food articles in an angularized posture to facilitate the cooling thereof wherein the rack is designed for seatment upon an underlying support surface comprising in combination, a unitized modular rack formed by a plurality of channels, said rack including a plurality of leg means for maintaining a lower surface thereof above an underlying support surface, a handle mounted on and extending laterally outwardly from one end of said rack, each of said channels bounded by opposed sidewalls wherein each of said sidewalls is formed by spaced ribs having open spaces therebetween, and an open top end, the bottom portion of each of said channels having a V-shaped configuration and having one leg of said V-shaped bottom portion formed by a solid wall said wall being solid throughout both the length and width dimensions thereof, and the opposed leg of said V-shaped bottom portion being essentially an open space with at least one support rib extending laterally thereacross thereby to provide food article support, said channels further including a support flange mounted on the top end of each of said channel sidewalls and positioned above said solid wall of said V-shaped bottom portion such that upon the angularized disposition of the food article within said channel, the top portion of the food article will rest against the support flange thereby to be held in spaced relation with respect to the corresponding side wall and to permit optimum efficiency in terms of air circulation to cool the food article, as said channels, handle, and leg means being formed of the unitary construction, whereby hot food articles such as toasted bread may be positioned within the channel of the said rack, the solid wall portion of the V-shaped bottom portion of the channel providing a wall against which said food article will slide downwardly and angularize the food article such that the top end is resting against the upper end of the side wall immediately above the solid wall portion of the V-shaped bottom portion of the channel, and the substantially open construction of the channel providing air circulation passages to effect efficient cooling of the food article.

2. The rack as set forth in claim 1 wherein said handle extends laterally outwardly from the top portion of one of the side ends of said rack.

3. The rack as set forth in claim 1 above, wherein said leg means comprises a series of four leg ends extending downwardly from each corner end of said rack for a distance slightly below the apex of each of said V- shaped channels such that said rack is maintained with the bottom portion thereof out of contact with the underlying support surface.

4. The rack as set forth in claim 1 above, wherein said rack is provided with a series of four food-holding channels, each of said channels constructed substantially identically with the next adjacent channel.

5. The rack as set forth in claim 4, wherein each of said channels is substantially open, including an open top, open sidewalls formed by spaced ribs with open spaces therebetween, and a V-shaped bottom portion having at least one open leg thereby to permit efficient air circulation about the retained hot food article and effect efficient cooling thereof.

* * * * *